July 6, 1943. K. E. SOMMERFELD 2,323,686
AUTOMATIC GLASS CUTTING MACHINE
Filed Aug. 17, 1940 5 Sheets-Sheet 4
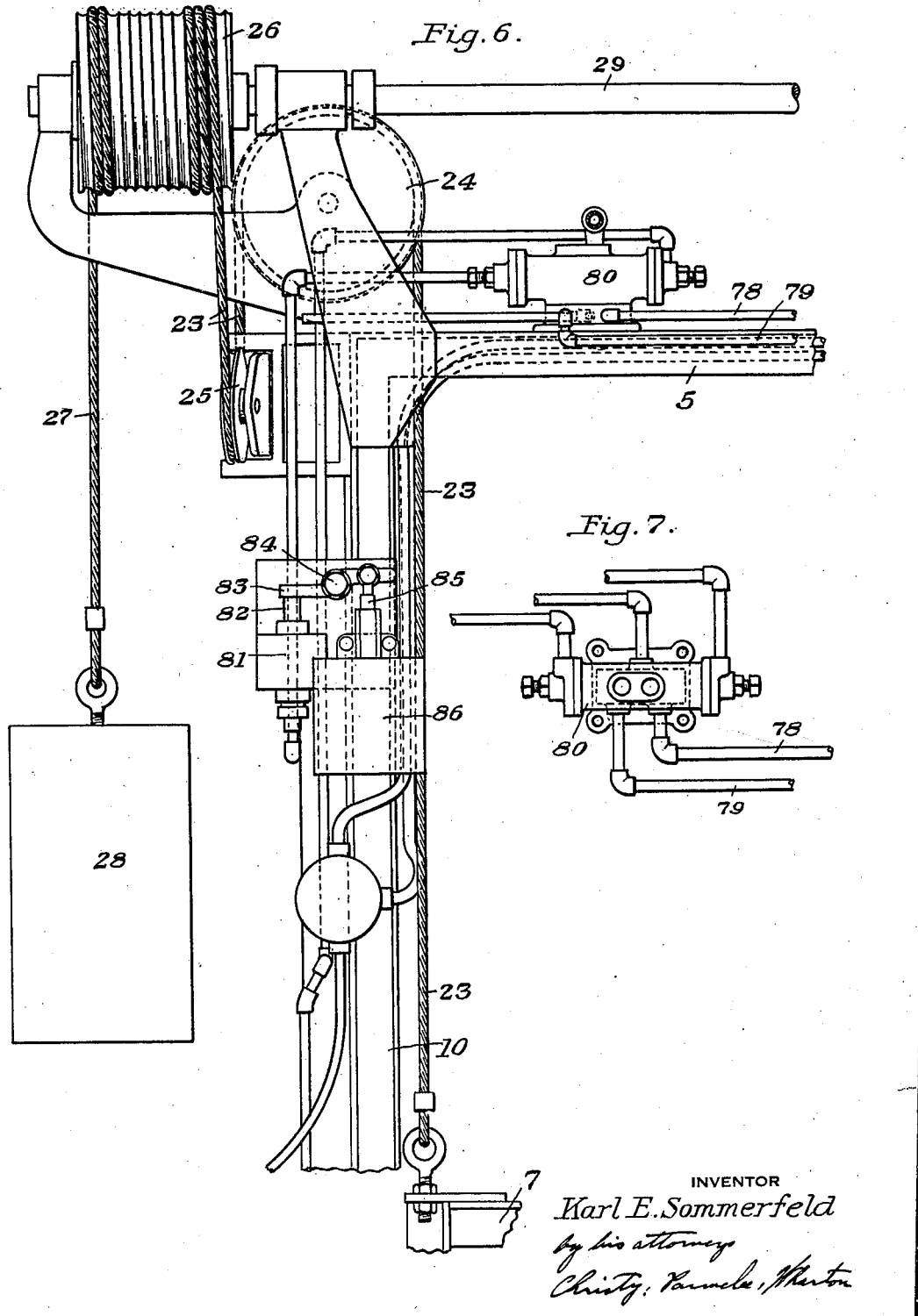
INVENTOR
Karl E. Sommerfeld

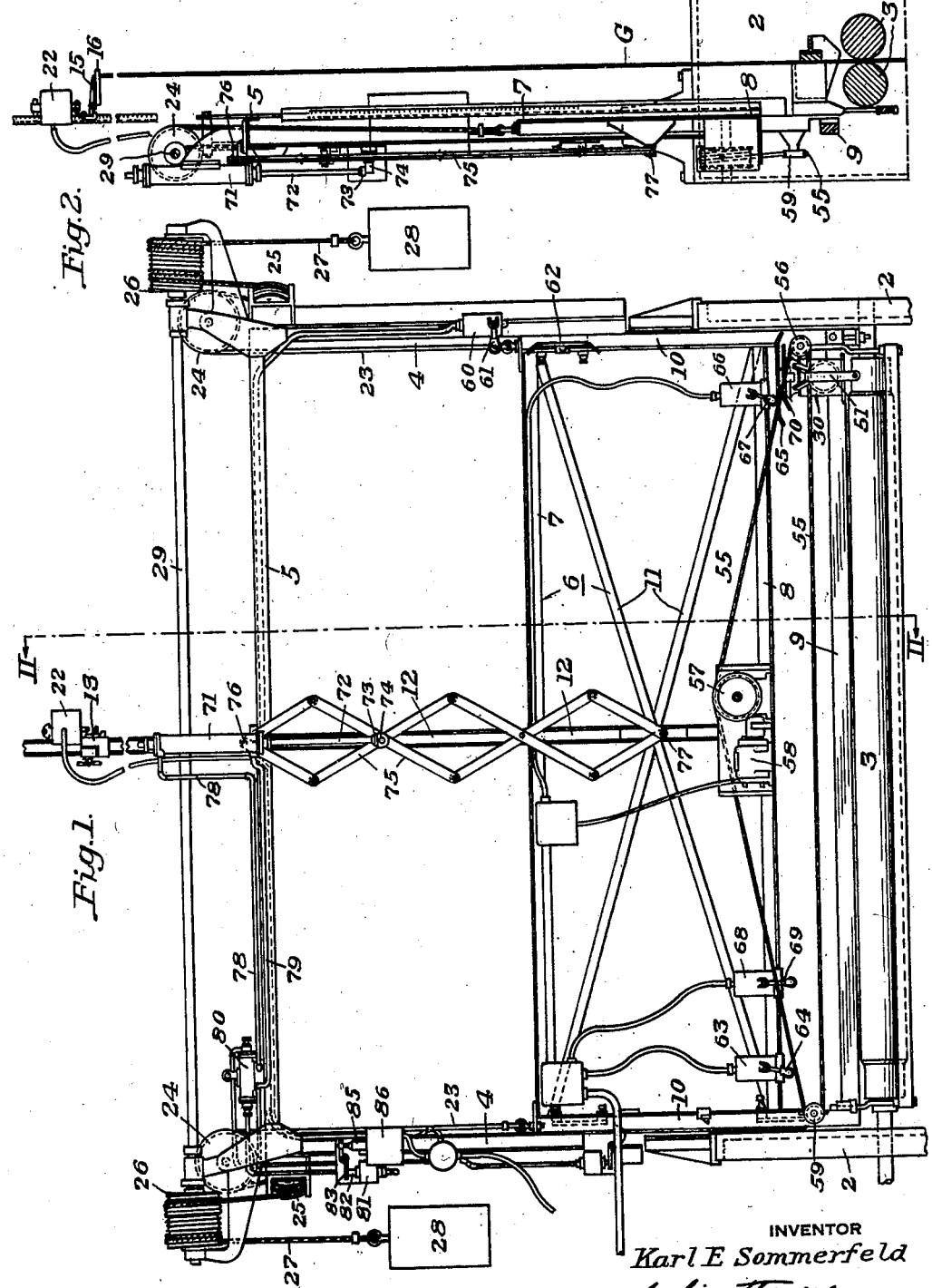

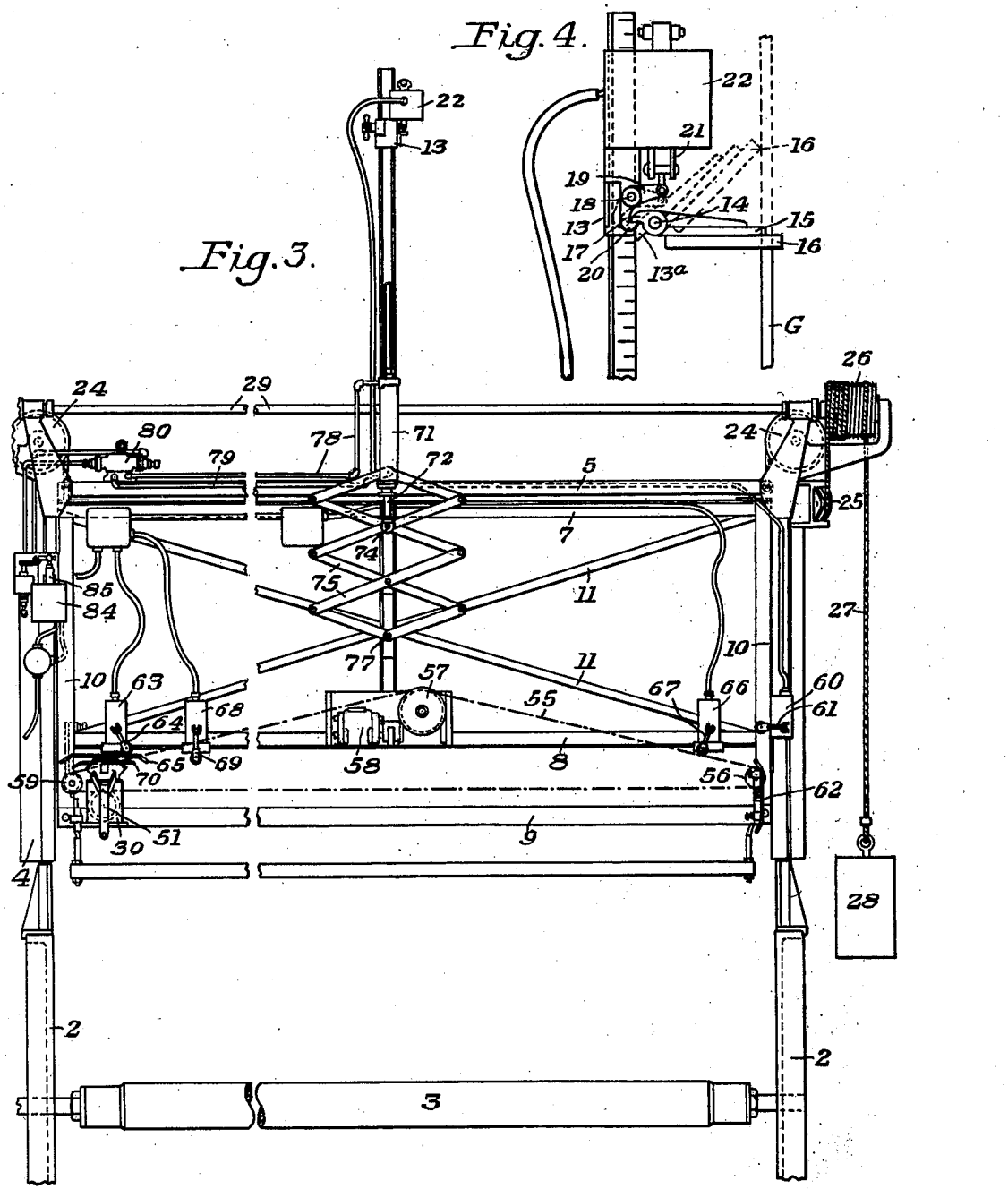

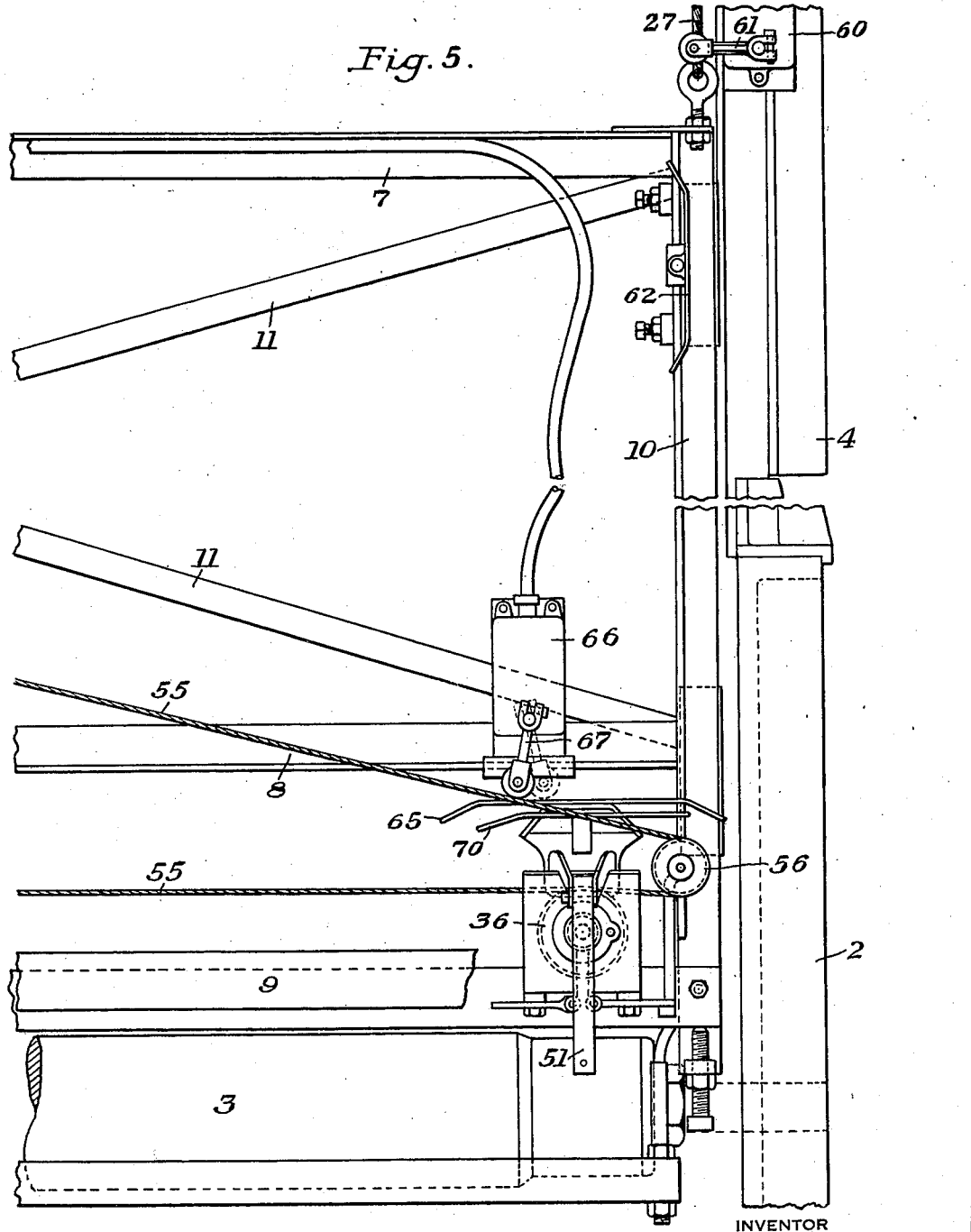

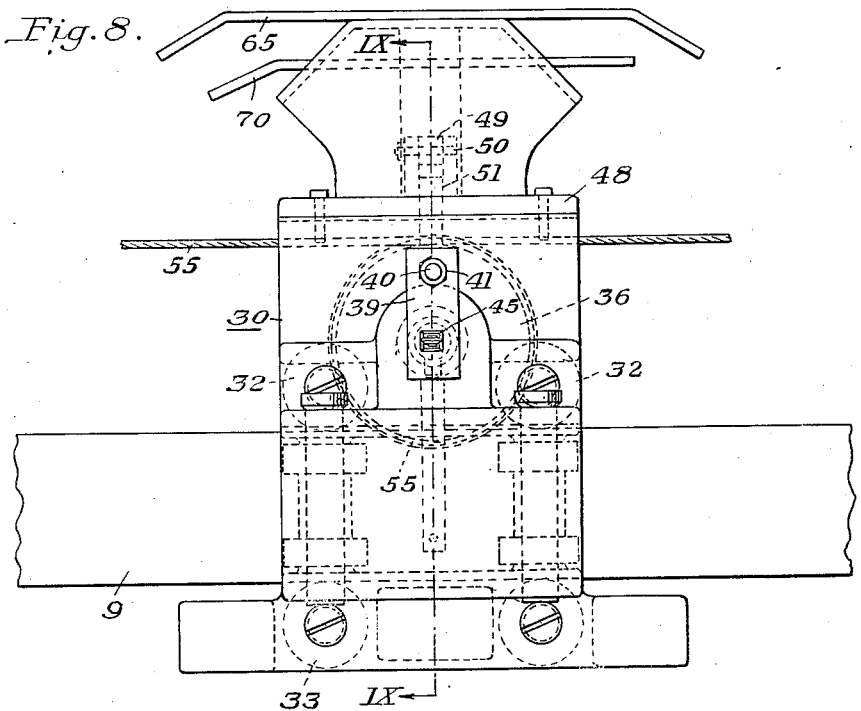
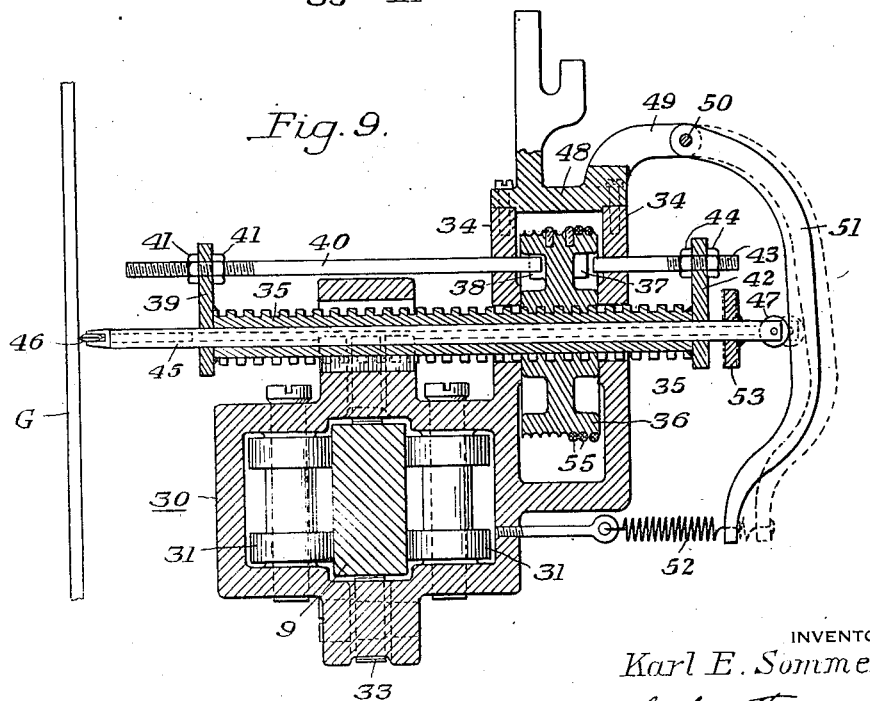

Patented July 6, 1943

2,323,686

UNITED STATES PATENT OFFICE 2,323,686

AUTOMATIC GLASS CUTTING MACHINE

Karl E. Sommerfeld, Pittsburgh, Pa., assignor to Sommerfeld Machine Company, Braddock, Pa., a corporation of Pennsylvania Application August 17, 1940, Serial No. 353,095

17 Claims. (Cl. 33—32)

This invention is for an automatic glass scoring or cutting machine for use in the manufacture of sheet glass, and is for a mechanism operated by the movement of the glass sheet itself for scoring the glass at predetermined regular intervals to thereby enable the glass to be broken into sheets of uniform size.

The invention is especially designed for application to the top of Fourcault and similar continuous sheet glass machines where the glass as it emerges from the forming apparatus, is traveling vertically upward. At the present time it is the practice to provide at the top of the Fourcault machine a guide in which there is a vertically movable cage. This cage is provided with a horizontal bar. As the glass emerges from the top of the machine it engages the cage causing it to ride upwardly with the glass. When the predetermined length of glass has been projected from the top of the machine, the operator using the horizontal bar as a guide, runs a glass cutter across the sheet. Since the bar is moving upwardly at the same speed as the glass sheet, the mark which is scored on the glass is approximately square, but considerable variation results between the sheets because the operator does not always hold the cutter bar in the same position, and the edges of the sheets themselves may not be square due to the change in the angle at which the operator holds the cutter as he moves it across the guide bar. It is therefore the practice to cut the sheets only approximately to length and to thereafter cut them accurately to length on a cutting table. This of course requires that both edges of the glass be trimmed a second time and results in increased labor and in a waste of glass, and this waste is increased due to the fact that each handling results in additional breakage.

Attempts have heretofore been made to replace the hand operation with automatic cutting mechanism, but such mechanisms as have heretofore been designed for the purpose have not been satisfactory due to the fact that the movement of the parts was not correlated in time with the movement of the glass sheets and also due to the fact that the automatic scoring devices as heretofore developed do not adjust themselves to irregularities which exist in the surface of flat glass.

According to the present invention there is provided an automatic cutting machine controlled by the glass sheet itself which cuts the sheets into uniform lengths, the machine being adjustable to vary the length of the sheets being cut and wherein all of the movements of the machine are properly correlated to the movement of the traveling sheet of glass. The invention clearly provides an improved form of cutter mechanism which adjusts itself to variations in thickness of the glass and to irregularities in the surface of the glass so that the sheets are uniformly scored notwithstanding the presence of the usual irregularities.

My invention may be readily understood by reference to the accompanying drawings which illustrate the present preferred embodiment of my invention and in which Figure 1 is a front elevation of a complete mechanism embodying my invention;

Figure 2 is a transverse vertical section in the plane of line II—II of Figure 1;

Figure 3 is a view similar to Figure 1 on a somewhat larger scale but showing the cage in an elevated position, part of the machine being broken away;

Figure 4 is a detail view of the bead and automatic latch for releasing the bead which is provided for operating the mechanism, the view being a side elevation;

Figure 5 is a front elevation of a portion of the machine on a larger scale than Figures 1 and 3.

Figure 6 is a front elevation of another portion of the machine, this view being on the same scale as Figure 5 but showing a portion of the opposite side of the frame of the machine;

Figure 7 is a detail view of an air valve through which the lowering of the cage is controlled;

Figure 8 is a front elevation of the cutter carriage itself, the view being on a scale very much larger than Figures 1 and 3;

Figure 9 is a longitudinal vertical section through the mechanism shown in Figure 8, the view being substantially in the plane of line IX—IX of Figure 8.

Referring to Figures 1, 2 and 5 of the drawing particularly, 2 designates side frame members adapted to be mounted at the top of a Fourcault or similar continuous sheet glass-producing unit. Supported in the space between the two side frame members 2 are guide rollers 3 through which the upwardly traveling sheet of glass, designated G in Figure 2, passes as it emerges from the glass-forming unit. Secured to each of the members 2 is a vertically extending side frame member or guide rail 4. The two side frame members 4 are connected at their upper ends by a horizontal crossbar 5. This frame provides a guideway for a vertically movable cage designated generally as 6. This cage has a top crossbar 7, an intermediate crossbar 8, and a lower crossbar 9 which are all connected together by side frame members 10 at each side of the cage and by diagonal cross braces 11. The cage is also provided with a vertically extending central post 12 preferably formed from a length of channel iron. It projects beyond the top of the upper rail 7 of the cage and beyond the top rail 5 of the frame, and as shown in Figure 2 it is located in a plane to one side of the plane of the cage and of the frame. The arrangement is such that the cage 6 with its central post 12 may be raised and lowered inside the stationary supporting frame comprising the side members 4 and the crossbar 5, the crossbar 5 of the stationary frame determining the uppermost limit of movement of the cage.

Adjustably mounted on the upper portion of the post 12 is an adjustable clamping shoe 13 best shown in Figures 3 and 4, which shoe has a forwardly extending projection 13a on which is pivotally supported by means of a pivot at 14 a pad 15, the pad 15 preferably having a wooden plate 16 on the undersurface thereof. The pad 15 is provided rearwardly of the pivot 14 with a lug or dog 17. Pivotally supported at 18 on the clamping shoe 13 is a bell crank 19 having a latching lug 20 for cooperation with the lug or dog 17 on the pad 15. The other arm of the bell crank is connected to the armature 21 of an electric solenoid 22. The arrangement is such that when the dog 17 is engaging the latching lug 20, the pad 15 is restrained from the movement about the pivot 14, but when the solenoid 22 is energized to depress the armature 21, the latching lug 20 is moved to the left as viewed in Figure 4 to clear the dog 17, whereupon the pad 15 may tilt upwardly to the position shown in dotted lines.

The pad 15 projects across the path of travel of the upwardly moving sheet of glass G so that when the pad is latched against movement, the upper edge of the glass sheet will strike the surface 16 of the pad, and since the pad cannot pivot, the upward movement of the glass will be transmitted through the pad to the supporting post 12 and to the cage thus causing the cage to travel upwardly as the glass travels upwardly. When the cage has reached a predetermined height and the glass has been cut in the manner hereinafter described, the solenoid 22 is energized to trip the pad allowing it to swing inwardly clear of the glass, whereupon the cage can travel down with the pad riding past the surface of the sheet of glass G. It is thus possible for the cage to be moving down while the glass sheet is still moving upwardly, but this is possible only after the solenoid 22 has been operated to release the latch. It may be pointed out that in the operation of the machine, after the cage has been lifted a predetermined distance, the glass is scored as will be hereinafter more fully described. After the scoring operation has been completed, the cage is dropped down to repeat its cycle of operation while the upper edge of the sheet of glass is pulled to the right as viewed in Figure 4 causing it to snap off along the line of the score or cut. It is for this reason that it is desirable to have the cage moving down at certain times while the sheet of glass is continuing to move upwardly.

Attached to each side of the cage is a cable 23. Each of the cables 23 passes over a guide sheave 24 and another guide sheave 25 and has its other end wound about and secured to a take-up drum 26. Each take-up drum also has a second cable 27 wound thereon from which is suspended a counterweight 28. The weights 28 counterbalance the weight of the cage so that the upward movement of the cage imposes a very slight load on the upwardly moving sheet of glass. The two drums 26 are connected by a common shaft 29. Both drums must, therefore, wind and unwind at the same rate for both sides of the cage will, therefore, move at the same rate and the cage will not bind in the guideways by reason of one end rising or lowering faster than the other. It is important that the cage shall be kept horizontal not only to prevent binding in the guideways, but it is also necessary in order that the glass will be cut off square.

The glass cutting or scoring device itself comprises a carriage designated generally as 30 (see Figures 8 and 9) movable along the horizontal bar 9 on the cage. This carriage is provided with longitudinally spaced vertical rollers 31 which bear against the opposite faces of the bar to provide a rolling contact between the carriage and the bar. The carriage is also provided with longitudinally spaced upper rollers 32 that ride on the top edge of the bar 9 and with similar rollers 33 that ride on the bottom edge of the bar 9. The carriage thus has a rolling contact with the bar along which it moves, and the several rollers hold the carriage steady. At one side of the carriage is a bracket 34 through which passes an externally threaded sleeve 35, this sleeve being of sufficient length to extend entirely across the top of the carriage. Confined between the two upwardly extending plates forming the bracket 34 is a drum 36 having a grooved periphery and having an internally threaded hub through which the sleeve 35 is screwed. The arrangement is such that when the drum 36 is rotated in one direction, the threaded sleeve 35 is moved toward the left as viewed in Figure 9, and when it is turned in the opposite direction, the threaded sleeve is moved toward the right. The web of one face of the drum 36 has a lug 37 formed thereon, and the opposite face of the web has a similar lug 38. At one end of the sleeve 35 there is a bracket 39 that adjustably supports a rod 40, the position of the rod 40 being determined by the opposed nuts 41. This rod is of sufficient length to project through one of the plates 34 and engage the lug 38 on the drum. At the opposite end of the sleeve 35 is a similar bracket 42 which adjustably supports a rod 43, the position of which is determined by nuts 44. The inner end of this rod 43 passes through one of the plates 34 and is adapted to engage the lug 37 opposite the lug 38. The rods 40 and 43 cooperating with the lugs 38 and 37 respectively, provide adjustable stops for limiting the rotative movement of the drum 36. With the parts in the position shown in Figure 9, for example, the drum 36 cannot turn in a counterclockwise direction because of the engagement of the rod 40 with the lug 38. The drum, however, may turn in a clockwise direction because the lug 38 moves away from the stop rod 40. As the drum continues to rotate in a clockwise direction, the threaded sleeve 35 is propelled toward the left as viewed in Figure 9, and this carries the inner end of the rod 40 out of the path of travel of the lug 38. It simultaneously advances the end of the rod 43 into the path of travel of the lug 37 on the opposite face of the drum. Adjustable rods 40 and 43, therefore, provide stops to limit the free turning movement of the drum and thus also limit the back and forth travel of the sleeve 35. The sleeve 35 has a square or non-circular opening extending throughout its length. A square or non-circular rod 45 is slidably received in the sleeve, this rod being permitted to reciprocate in the sleeve but not turn. At its inner end, which is the left-hand end as viewed in Figure 9, it carries a glass cutter or scoring means such as the cutter wheel 46. The other end of the rod which projects beyond the right-hand end of the threaded sleeve is provided with a roller 47. Carried on the top of the bracket comprising the two plates 34 is a member 48 having a rearwardly extending arm 49 to which is pivotally secured at 50 a lever 51. This lever bears against the roller 47, and a tension spring 52 having one end secured to the free end of the lever 51 and one end anchored to the carriage serves to resiliently urge the lever 51 toward the left as viewed in Figure 9. This pressure is transmitted through the roller 47 to the glass cutter. The square rod 45 is provided adjacent the outer or right-hand end as viewed in Figure 9, with a stop or abutment 53 adapted to contact with the bracket 42 to limit the endwise travel of the glass cutter under the influence of the spring-operated lever 51.

In Figure 9 the cutter is shown in contact with the sheet of glass and with the stop member 53 spaced from the bracket 42. After the cutter has been moved into contact with the sheet of glass, and the cutting operation has been completed, the drum 36 is rotated in an anticlockwise direction and the movement of the sleeve 35 toward the right withdraws the cutter from engagement with the glass. The travel of the sleeve 35 is preferably adjusted to a point where, when the cutter is engaging the sheet of glass, there will be a separation between the stop 53 and the bracket 42 so that the spring can exert its full pressure against the cutter and so that the cutter can follow irregularities in the surface of the glass without interference from the stop 53 coming into contact with the bracket 42. In other words, stop rods 40 and 43 are adjusted to permit the drum 36 to turn far enough to allow the sleeve 35 to travel a distance slightly greater than that required to enable the cutter to barely contact the sheet of glass.

It is contemplated in the operation of the machine that when the glass is to be scored, the cutter will be operated first to bring the scoring device into contact with the surface of the sheet at one edge of the sheet. Then the carriage will be moved along the bar 9 to score the full width of the glass. The cutter will then be retracted and the carriage returned to its initial position with the cutter out of contact with the glass. The advancing and retracting of the cutter, as well as the movement of the carriage along the bar 9 is accomplished automatically through a cable which engages the grooved periphery of the drum 36. This cable, designated 55, makes several turns around the periphery of the drum 36. As shown in Figures 1 and 3, the cable after passing from the drum, extends to one side of the carriage around a sheave 56 to a drum 57 which is operated by a reversible motor 58. The other reach of the cable 55 passes around a sheave 59 at the left-hand end of the frame as viewed in Figure 1 to take-up drum 57, the arrangement being such that as the cable is paid off the drum 57 in one direction, it is wound up on the drum at the same speed from the opposite direction. With the parts in the position shown in Figure 9, the carriage is at the right-hand side of the frame, as shown in Figure 1. The motor 58 is then operated to drive the drum 57. This causes the drum 36 on the carriage to be rotated in a clockwise direction to advance the cutter in position to engage the glass, but after the drum 36 is rotated to the limited extent necessary, its further rotation is stopped by the engagement of the lug 37 with the stop rod 43. The continued operation of the drum 57 winding up on one reach of the cable and paying out on the other causes the carriage to be pulled by means of the cable along the bar 9. When the carriage has completed its travel across the width of the sheet of glass, the motor 58 is reversed reversing the tension on the cable 55. This is effective first for rotating the drum 36 on the carriage a limited extent in a counterclockwise direction to withdraw the cutter from engagement with the glass and then to pull the cutter back along the bar 9. The motor 58 as well as the drum 57 which it operates are of course mounted on the cage so that the cutting operation takes place as the cage is moving up with the sheet of glass.

The operation of the cutter is in the first instance controlled by the vertical movement of the cage. Adjacent one of the side frame members 23, i. e., the right-hand frame member as viewed in Figure 1, there is a vertically adjustable contacting switch 60 having a contact arm 61, the switch being of the well-known type. The cage is provided adjacent its right-hand edge with a cooperating shoe 62. The switch 60 is connected into the circuit for the motor 58 so that when the cage lifts up to a point where the shoe 62 rocks the lever 61 a predetermined distance, a circuit will be closed to operate the motor 58 in the manner described to initiate the operation of the cutter. On the cross member 8 of the frame at the left-hand limit of travel of the carriage 30 is a similar switch 63 having a contact arm 64. The carriage is provided with a shoe 65 that engages the lever 64. The switch 63 is connected with the motor 58 to drive it in the reverse direction through a standard reversing circuit forming no part of the present invention. The arrangement is such that as the carriage reaches the left-hand limit of its travel, the switch arm 64 is operated to reverse the motor 58 and hence the direction in which the cable 55 is operated. At the extreme right-hand end of the crossbar 8 on the cage is another switch 66 with a switch arm 67 which is engaged by the shoe 65 to stop the motor when the carriage has returned to its starting position and until the switch 60 has again been operated. The mechanism described thus causes the glass to be scored every time the cage is moved upwardly a predetermined distance, and as the cage is operated by the upwardly traveling sheet of glass, it will be seen that the glass is scored at regular distances cutting the sheets into predetermined lengths. Since the cutter is resiliently urged against the glass, the pressure of the cutter against the glass is substantially uniform and is adjusted to an optimum degree, and the cutter is free to follow the irregularities in the surface of the glass. Also, since the carriage is guided along the bar 9 on which it has a close working fit, the cutting of the glass is square and free of undulations up or down. After the scoring has been completed, the cage should be dropped down to its lowermost position to repeat the cycle. The attendant standing on the platform adjacent the machine after each scoring operation and before the next scoring operation grasps the upper edge of the sheet and pulls it away from the frame, i. e., toward the right in Figure 2 causing the sheet to snap along the line where it has been scored. In order to enable the cage to move back to its lowermost position before the scored sheet has been broken away, solenoid 22 is energized to release the latch 20 as described in connection with Figure 4 and permit the pad 15 to swing upwardly a distance sufficient to clear the sheet on the downward travel of the cage. This operation of the solenoid 22 is controlled by means of a third switch 68 located on the horizontal frame member 8 of the cage, this switch having a depending arm 69 which is engaged by a contact shoe 70 on the top of the cutter carriage 30. The switch 68 is of a character which does not close any circuit when the lever 69 is swung to the left as viewed in Figures 1 and 3, but when it is swung to the right as viewed in these figures, it closes a circuit to energize the solenoid and trip the latch. Thus the tripping of the latch occurs after the cutting carriage has scored the glass and after the carriage has started to move back to its initial position. The scoring of the glass is completed, therefore, before the latch is released, and thus it is assured that the cage will continue to move upwardly until after the glass has been completely scored across its entire width.

For pushing the cage back to its lowermost position upon release of the pad 15 from engagement with the upper edge of the sheet, there is provided at the center of the stationary frame above the cage an air cylinder 71 that operates a piston rod 72 (see Figures 1 and 3). The lower end of the piston rod has an abutment 73 (see Figure 2) adapted to bear against the projecting end of a pin 74 which passes through two levers of a lazy tong system of levers designated generally as 75. The upper end of this lazy tong is secured to a side of the cylinder 71 at 76, while the lower end is contacted at 77 to a post secured to the middle vertical post 12 on the cage. When the cage is in an elevated position as shown in Figure 3, and the piston rod 72 is forced down by energizing the cylinder 71, pressure is applied to pin 74 of the lazy tong causing it to extend itself and thus exert a downward pressure on the cage. The advantage of using a lazy tong resides in the fact that because of the cage being counterbalanced, very little power is required to move it either upwardly or downwardly, and it is therefore possible to move the cage down with very little power by means of a cylinder of very short stroke. Because the abutment 73 at the end of the piston rod 72 abuts against the pin 74 of the lazy tong but does not provide any positive connection between the lazy tong and the piston, the piston can be retracted as soon as the cage has been lowered to its lowermost limit of travel without simultaneously lifting the cage. The admission of fluid pressure, preferably air, to the cylinder 71 is controlled through two pipes 78 through which fluid is admitted to and discharged from the upper end of the cylinder and pipe 79 communicating with the lower end of the cylinder. These pipes in turn communicate with a standard type of control valve 80 of a type known to those familiar with fluid pressure circuits and forming no part per se of the present invention but which is of a nature such that when fluid pressure is flowing through the pipe 78, the pipe 79 is venting to atmosphere and vice versa. The valve 80 is of itself of a fluid pressure actuated type being controlled by a valve 81 having a valve stem 82 (see Figure 6).

Valve stem 82 is in turn actuated by a lever 83 pivoted to the left-hand side of the machine frame at 84. The other end of the lever 83 is attached to the armature 95 of a solenoid 86. The solenoid 86 is also governed by the switch 68. The arrangement is such that when the switch 68 is operated to release the pad 15, the valve stem 82 of the valve 81 will be depressed to actuate the control valve 80 to admit fluid pressure to the pipe 78 and open the line 79 and thereby cause the piston 72 to be forced downwardly to lower the frame, but when this operation has been completed and the solenoid 86 de-energized and the valve 81 restored to normal position, the flow of fluid into the cylinder 71 will be reversed and the piston rod 72 moved to its upper position.

As clearly shown in Figure 5, the contact shoe 62 that initiates the operation of the cutter is adjustable on the frame of the cage, being provided with set screws as shown to secure it at a predetermined elevation. The lower down on the cage the shoe is set, the greater will be the height through which the cage will move before the scoring operation is initiated, and hence the scoring can be adjusted in reference to the elevation of the platform on which the workmen stand and break off the scored sheets. The operation of the solenoid 22 and of the fluid pressure cylinder may also be varied by moving the switch 68 along the bar 8 either to the right or to the left. The switches 63 and 66 are also adjustable along the bar 8 so that the machine can be readily adjusted to different widths of glass.

In the operation of the machine after all of the parts have been adjusted for the production program, the top edge of the glass emerging from the glass-forming machine engaging against the underside of the pad 15 lifts the cage vertically. When the cage is moved a predetermined distance, the switch 60 energizes the motor to initiate the cutting operation, and the cutter is first thrust inwardly and the carriage then travels across the sheet of glass. At the completion of the cutting stroke, the switch 63 is energized to reverse the motor, whereupon the cutter is quickly withdrawn from the surface of the glass and then only after the cutter has been retracted will the carriage start back to its initial position. As it travels back to its initial position, the switch 68 is operated to release the pad 15 to disengage the cage from the upper edge of the sheet of glass, and the cylinder 71 is energized to push the cage back to its lowermost position. After the carriage has moved past the switch 68, the circuit to the latch-controlling solenoid 22 is again opened and in the meantime the scored sheet of glass has been broken away. This allows the pad 15 to drop back to its horizontal position and automatically latch itself to thereby be engaged against by the oncoming edge of the glass sheet.

While I have illustrated and described in detail one preferred embodiment of my invention, it will be understood that this is only by way of illustration and that the parts may be variously constructed and that various changes and modifications are contemplated in the construction of the machine and within the scope of the following claims.

I claim as my invention:

1. Sheet glass cutting apparatus of the class described comprising a frame, a cage movable up and down in the frame, cutter means movable across the cage and carried by the cage, means secured to and normally projecting from the cage to be engaged by the edge of an upwardly moving sheet of glass whereby the cage is caused to move upwardly with the glass, and means for automatically releasing said last-named means from such engagement with the sheet of glass.

2. Glass cutting apparatus of the class described comprising a frame, a cage guided in said frame for up and down movement, a cutter means on the cage movable horizontally across the cage, means carried on the cage normally projecting laterally from the plane of the cage in a position to be engaged by the edge of an upwardly moving sheet of glass, and means controlled by the cage for releasing said last-named means from such engagement with the glass.

3. Glass cutting apparatus of the class described comprising a frame, a cage guided in said frame for up and down movement, a cutter means on the cage movable horizontally across the cage, means carried on the cage normally projecting laterally from the top plane of the cage in a position to be engaged by the edge of an upwardly moving sheet of glass, means controlled by the cage for releasing said last-named means from such engagement with the glass, and means for moving the cage in a direction opposite the direction in which it is moved by the engagement of said projecting means with the edge of the glass sheet.

4. Glass cutting apparatus of the class described comprising a frame, a cage guided in said frame for up and down movement, a cutter means on the cage movable horizontally across the cage, means carried on the cage projecting laterally from the top plane of the cage in a position to be engaged by the edge of an upwardly moving sheet of glass, and means controlled by the travel of the cage for moving said last-named means out of such glass engaging position.

5. Glass cutting apparatus of the class described comprising a frame, a cage guided in said frame for up and down movement, a cutter means on the cage movable horizontally across the cage, means carried on the cage projecting laterally from the plane of the cage in a position to be engaged by the top edge of an upwardly moving sheet of glass, means controlled by the travel of the cage for moving said last-named means out of such glass engaging position, and means for automatically lowering the cage to its initial position when said projecting means is disengaged from the edge of the sheet of glass.

6. Glass cutting apparatus of the class described comprising a frame, a cage movable up and down in the frame, cutter means on the cage movable back and forth there-across, means supported by the cage projecting laterally therefrom into the path of travel of the sheet of glass to be cut for engagement with the edge of said sheet whereby the cage may be raised by the upward movement of the sheet of glass, said means comprising a pad member hinged to swing in a vertical arc and biased to normally assume a horizontal position, latch means for holding the pad member in a horizontal position, and means controlled by the movement of the cage for releasing said latch.

7. Glass cutting apparatus of the class described comprising a frame, a cage movable up and down in the frame, cutter means on the cage movable back and forth there-across, means supported by the cage projecting laterally therefrom into the path of travel of the sheet of glass to be cut for engagement with the edge of said sheet whereby the cage may be raised by the upward movement of the sheet of glass, said means comprising a pad member hinged to swing in a vertical arc and biased to normally assume a horizontal position, latch means for holding the pad member in a horizontal position, means controlled by the movement of the cage for releasing said latch, and means for moving the cage downwardly after said latch has been released.

8. Glass cutting apparatus of the class described comprising a frame, a cage guided in said frame for up and down movement, a cutter means on the cage movable horizontally across the cage, means carried on the cage projecting laterally from the plane of the cage in a position to be engaged by the edge of an upwardly moving sheet of glass, means controlled by the travel of the cage for moving said last-named means out of glass engaging position, and means for automatically lowering the cage to its initial position comprising a fluid pressure piston and cylinder motor and a lazy tong for transmitting downward motion from said motor to the cage.

9. Glass cutting apparatus of the class described comprising a frame, a cage movable up and down in the frame, cutter means movable back and forth across the cage and carried by the cage, a post mounted on and attached to the cage, a hinged pad projecting from the post into the path of travel of the glass sheet to be cut, a latch for normally restraining the pad against movement on its hinge, and means for releasing said latch.

10. Sheet glass cutting apparatus of the class described comprising a frame, a cage movable up and down in the frame, cutter means movable across the cage and carried by the cage, means projecting from the cage to be engaged by an upwardly moving sheet of glass, means for automatically retracting said last-named means to disengage it from the sheet of glass, the cage having mechanically interconnected counter-weights operatively connected to each side thereof for maintaining the cage horizontal, and means for automatically lowering the cage to its initial position after it has been elevated by the engagement of the glass with the said projecting means.

11. Sheet glass cutting apparatus of the class described having a cage which is moved in one direction by the movement of the sheet of glass to be cut and which is automatically moved in the opposite direction after it has traveled with the glass a predetermined distance, having a guideway there-across, a carriage on the guideway, a cutter on the carriage movable into and out of glass cutting position, mechanical means for moving the cutter, and common motor driven means on the cage for moving the carriage and actuating said mechanical means for operating the cutter.

12. Sheet glass cutting apparatus of the class described having a cage which is moved in one direction by the movement of the sheet of glass to be cut and which is automatically moved in the opposite direction after it has traveled with the glass a predetermined distance, having a guideway there-across, a carriage on the guideway, a cutter on the carriage movable into and out of glass cutting position, common means for moving the carriage in one direction across the cage with the cutter projected into glass-engaging position and for returning the carriage to the starting point with the cutter retracted out of glass-engaging position, said means including a cable and a reversible motor for operating the cable, and a lost motion mechanism on the carriage through which the cable operates to move the carriage and through which lost motion mechanism the cutter is advanced when the carriage moves in one direction and retracted when the carriage moves in the other direction.

13. For use in glass cutting mechanism of the class described, a carriage, a reciprocable sleeve on the carriage having a threaded exterior, a drum threaded on said sleeve arranged to effect a rectilinear movement of the sleeve upon rotation of the drum, means governed by the rectilinear movement of the sleeve for limiting the movement of the drum in either direction, a cutter on the carriage, resilient means for urging the cutter into operative position, means operated by the rectilinear movement of the sleeve for retracting the cutter, and a cable engaging said drum for rotating the drum and moving the carriage.

14. In a glass cutter of the class described, a cutter carriage, a trackway in which the carriage is mounted and along which it is movable, a cutter supported on the carriage for movement transversely to the direction of travel of the carriage, means for yieldably urging the cutter into cutting position, mechanical means for retracting the cutter from cutting position, and a motor driven means for driving the carriage and operating said last-named means.

15. In a glass cutter of the class described, a cutter carriage, a trackway in which the carriage is mounted and along which it is movable, a cutter supported on the carriage for movement transversely to the direction of travel of the carriage, means for yieldably urging the cutter into cutting position, means for retracting the cutter from cutting position, said last-named means comprising a threaded member having a drum thereon cooperating with the threads thereof, a cable passing around the drum for rotating it, and means for limiting the rotative movement of the drum after it has rotated in either direction a predetermined number of times.

16. A glass cutting mechanism of the class described comprising a cage, means on the cage for engaging the glass whereby the cage is moved in one direction with the glass, means for moving the cage in an opposite direction after it has moved a predetermined distance with the glass, a cutter carriage movable crosswise of the cage, reversible motor means on the cage for propelling the carriage back and forth across it, means controlled by the travel of the cage for initiating the operation of the carriage to drive it in one direction, and means operated by the carriage for reversing the motor after the carriage has traveled across the cage in one direction, and cutter means on the carriage.

17. A glass cutting mechanism of the class described comprising a cage, means on the cage for engaging the glass whereby the cage is moved in one direction with the glass, means for moving the cage in an opposite direction after it has moved a predetermined distance with the glass, a cutter carriage movable crosswise of the cage, reversible motor means on the cage for propelling the carriage back and forth across it, means controlled by the travel of the cage for initiating the operation of the carriage to drive it in one direction, means operated by the carriage for reversing the motor after the carriage has traveled across the cage in one direction, a cutter on the carriage movable into and out of cutting position, and means for advancing the cutter to cutting position before the carriage starts its cycle of movement and for retracting the cutter after the carriage has moved in one direction across the cage.

KARL E. SOMMERFELD.